(12) United States Patent
Bertin-Mourot et al.

(10) Patent No.: US 7,609,443 B2
(45) Date of Patent: Oct. 27, 2009

(54) PROJECTION AND/OR REAR PROJECTION SCREEN

(75) Inventors: Thomas Bertin-Mourot, Paris (FR); Yannick Lebail, Chevincourt (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/542,356

(22) PCT Filed: Jan. 7, 2004

(86) PCT No.: PCT/FR2004/000015

§ 371 (c)(1),
(2), (4) Date: Mar. 29, 2006

(87) PCT Pub. No.: WO2004/072722

PCT Pub. Date: Aug. 26, 2004

(65) Prior Publication Data

US 2006/0176553 A1   Aug. 10, 2006

(30) Foreign Application Priority Data

Jan. 15, 2003   (FR) ................................. 03 00381

(51) Int. Cl.
*G03B 21/60* (2006.01)
*G03B 21/56* (2006.01)

(52) U.S. Cl. ...................... 359/452; 359/453; 359/454; 359/459; 359/460

(58) Field of Classification Search ................ 359/443, 359/452–456, 459, 460
See application file for complete search history.

(56) References Cited

U.S. PATENT DOCUMENTS

| 3,609,000 | A | | 9/1971 | Miyano et al. | |
|---|---|---|---|---|---|
| 3,612,650 | A | * | 10/1971 | Miyano et al. | 359/452 |
| 3,655,263 | A | | 4/1972 | Hoffman et al. | |
| 3,726,583 | A | * | 4/1973 | Fujisaki et al. | 359/452 |
| 5,307,205 | A | * | 4/1994 | Ludwig, Jr. et al. | 359/453 |
| 5,831,774 | A | * | 11/1998 | Toshima et al. | 359/707 |
| 6,064,521 | A | * | 5/2000 | Burke | 359/443 |
| 6,262,840 | B1 | * | 7/2001 | Watanabe et al. | 359/453 |
| 6,304,378 | B1 | | 10/2001 | Clausen | |
| 6,327,088 | B1 | * | 12/2001 | Iwata et al. | 359/599 |
| 6,421,181 | B1 | * | 7/2002 | Yoshida et al. | 359/619 |
| 7,046,439 | B2 | * | 5/2006 | Kaminsky et al. | 359/452 |

(Continued)

FOREIGN PATENT DOCUMENTS

| EP | 0 414 313 | 2/1991 |
|---|---|---|
| EP | 0 478 187 | 4/1992 |
| EP | 0 561 551 | 9/1993 |
| EP | 0 770 902 | 5/1997 |
| GB | 1 140 416 | 1/1969 |
| WO | 02/41074 | 5/2002 |

*Primary Examiner*—Diane I. Lee
*Assistant Examiner*—Magda Cruz
(74) *Attorney, Agent, or Firm*—Oblon, Spivak, McClelland, Maier & Neustadt, L.L.P.

(57) ABSTRACT

The backprojection and/or projection screen comprises at least a first substrate joined to a scattering layer producing a subsurface effect, which offers a resolution of at least $5 \times 10^3$ dpi, the image being able to be displayed without blurring at a viewing angle of 180° on both faces of the screen.

20 Claims, 1 Drawing Sheet

U.S. PATENT DOCUMENTS

| | | | |
|---|---|---|---|
| 2001/0005282 A1* | 6/2001 | Etori et al. | 359/453 |
| 2002/0093607 A1 | 7/2002 | Van De Ven et al. | |
| 2002/0163722 A1 | 11/2002 | Gehring et al. | |
| 2003/0140820 A1* | 7/2003 | Bujard et al. | 106/493 |
| 2006/0012876 A1* | 1/2006 | Choi | 359/452 |
| 2006/0033991 A1* | 2/2006 | Toda et al. | 359/452 |

* cited by examiner

PROJECTION AND/OR REAR PROJECTION SCREEN

BACKGROUND OF THE INVENTION

1. Field of the Invention

The present invention relates to a backprojection and/or projection screen. It relates more particularly to a screen suitable for allowing an image to be displayed without any defect on both faces of the screen, this image possibly coming, for example, from a video projector or more generally from a light source positioned so as to face one of the faces of the screen.

2. Description of the Background

For the sake of understanding, the projection screen according to the invention has two faces, namely the main face of the screen on which the image coming from the light source is projected, which main face is generally positioned in the same region in space as the light source, and the opposite face of the screen on which the image projected on the main face appears when viewed in transmission. A backprojection screen has a main face and an opposite face possessing the same characteristics as the abovementioned projection screen but is distinguished therefrom by the fact that the user and the light source are not located in the same region in space but are on either side of the screen.

For the purposes of the present invention, the term "screen" will be used to encompass both a projection screen and a backprojection screen.

Several types of backprojection screen families for displaying such an image are known. Thus, plastic screens or diffusers are known, these rigid and translucent screens having a plastic matrix constituting the framework of the screen into which a plurality of metal oxide (for example $SiO_2$) particles are incorporated. These screens allow an image to be correctly viewed without any optical defect at a viewing angle possibly up to 180° only on one of the faces of the screen, the image appearing when viewed in transmission on the other face of the screen being of lower optical quality (presence of blurring). In addition, plastic backprojection screens are sensitive to ultraviolet and infrared radiation and to moisture, thereby limiting their lifetime and the perpetuity of their optical quality.

Also known are screens that can be unwound from a reel fastened to a support. They are also made of plastic, but are not translucent. They operate only in reflection and not in transmission.

Another screen technology was developed from diffusers that operate using the technology of liquid crystals. The main advantage of this type of screen lies, on the one hand, in their small thickness (of around 20 µm) and, on the other hand, most particularly, in the fact that, under the action of an electric field, they become transparent and no longer diffusing, their use in backprojection being however only a secondary use.

However, as drawbacks, the viewing angle is very limited (the viewing angle is around thirty degrees or so) and the image that appears on the opposite face is of poor optical quality, despite the small thickness of the screen (presence of blurring).

Document U.S. Pat. No. 5,870,224 discloses a structure of projection screen provided, on the one hand, on its main face, with a plurality of optical devices (cylindrical microlenses and Fresnel lenses) and, on the other hand, on its opposite face, a plurality of orifices (transparent and slightly diffusing regions) that are judiciously positioned relative to the respective optical foci of the said cylindrical lenses, allowing the projected image to be displayed.

This screen structure is particularly expensive, the viewing angle is also small (about 35°) and this device is not conducive to direct projection (view in reflection)

Finally, a last backprojection screen family consists of holographic diffusers.

The main advantage of this technology lies in the transparency of the screen and the adjustment of the viewing angle. However, here again, this screen structure is expensive, thereby confining it to small-format screens. The presence of blurring on the opposite face of the screen is also noted, despite the transparency of the screen.

SUMMARY OF THE INVENTION

The aim of the present invention is therefore to alleviate the drawbacks of the devices known from the prior art by providing a backprojection and/or projection screen suitable for displaying an image on both faces of the screen at a viewing angle possibly up to 180° on both faces, this display being effected without any optical defects on both faces, that is to say with excellent uniformity of the displayed image.

For this purpose, the backprojection and/or projection screen according to the invention is characterized in that it comprises at least a first substrate joined to a scattering layer producing a subsurface effect, said layer being suitable for obtaining a viewing angle of less than or equal to 180° on both faces of the said layer.

DETAILED DESCRIPTION OF THE PREFERRED EMBODIMENTS

Figure 1:
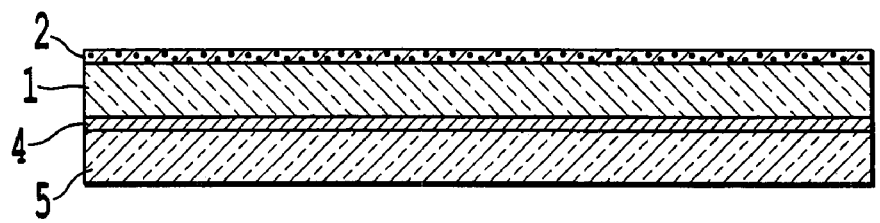
FIG. 1 shows an embodiment of the screen of the invention of a scattering layer (2) positioned on a face of a substrate (1) and a second substrate (5) laminated to the remaining face of first substrate (1) through an intervening lamination interlayer (4).
Figure 2:
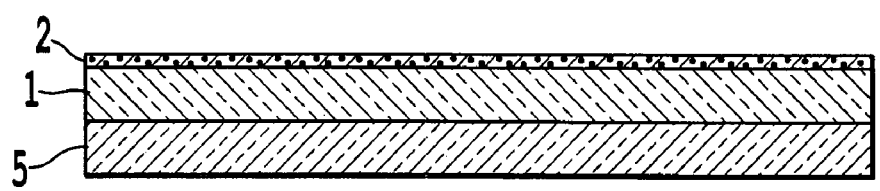
FIG. 2 shows another embodiment of the screen of the invention of a scattering layer (2) positioned on a face of a substrate (1) and a second substrate (5) laminated directly to the remaining face of first substrate (1).
Figure 3:
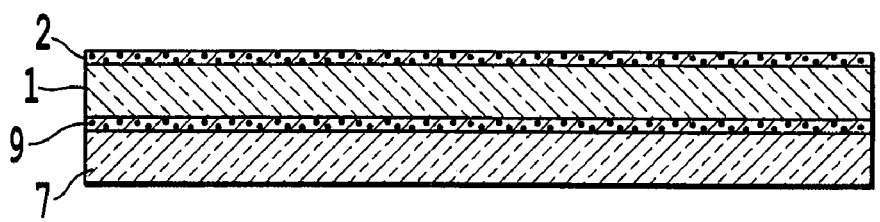
FIG. 3 shows an embodiment of the screen of the invention of a scattering layer (2) positioned on a face of a substrate (1) and a third substrate (7) laminated to the remaining face of first substrate (1) through an intervening peripheral bead (9).

To gain a better understanding of the invention, the word "subsurface" will be defined below. A layer is said to be subsurface when its thickness varies within the 0.5 to 50 µm range, especially the range between 0.5 and 10 µm and preferably between 0.5 and 5 µm. This definition is to be compared with a scattering layer producing a volume effect.

In the preferred embodiments of the invention, one or more of the following provisions may optionally also apply:

the resolution of the screen is between $5\times10^3$ and $1\times10^5$ dpi;

the scattering layer is deposited on one of the faces of the first substrate and a lamination interlayer is deposited on the opposite face of the said first substrate, the said interlayer in turn being joined to a second substrate;

the second substrate is a tinted substrate;

the scattering layer is deposited on one of the faces of a first substrate, the said first substrate being in turn joined to a second substrate so as to form a double-glazing unit;

the first substrate and the scattering layer are joined to a third substrate, a peripheral bead separating that face of the first substrate which is coated with the said scattering layer from the third substrate;

the scattering layer consists of elements comprising particles and a binder, the binder allowing the particles to be mutually agglomerated;

the particles are metal or metal oxide particles;

the particles are chosen from silicon, aluminium, zirconium, titanium and cerium oxides, or a mixture of at least two of these oxides;

the particle size is between 50 nm and 1 µm;

the thickness of the scattering layer is between 0.5 and 5 µm;

at least one of the first, second and third substrates is a glass substrate;

at least one of the first, second and third substrates is a transparent substrate based on a polymer, for example polycarbonate; and at least one of the first, second and third substrates includes a coating having another functionality, especially a coating with a low-emissivity function or an antistatic, antimisting, antifouling or antireflection function.

Other advantages and features of the invention will become apparent in the light of the detailed description that follows.

Thus, according to one embodiment of the invention, the scattering layer producing a subsurface effect consists of particles agglomerated in a binder, the said particles having a mean diameter of between 0.3 and 2 microns, the said binder being in a proportion of between 10 and 40% by volume and the particles forming aggregates whose size is between 0.5 and 5 microns, resulting in resolutions of between $5 \times 10^3$ and $1 \times 10^5$ dpi (dots per inch), the said layer having a contrast attenuation of greater than 40% and preferably greater than 50%. This scattering layer is described in Application WO 01/90787 and the contents of that application are incorporated in the present application for reference.

The particles are chosen from semitransparent particles and preferably from mineral particles such as oxide, nitride and carbide particles.

The particles will preferably be chosen from silicon, aluminium, zirconium, titanium and cerium oxides, or from a mixture of at least two of these oxides.

Such particles may be obtained by any means known to those skilled in the art and especially by precipitation or by pyrolysis. The particle size is such that at least 50% of the particles depart from the mean diameter by less than 50%.

When the layer is in an external position, the binder is also chosen to have an abrasion resistance sufficient for the backprojection system to be handled without any damage, for example in particular with the other substrates forming the screen are being mounted.

Depending on the requirements, the binder may be chosen to be a mineral binder, for example in order to increase the temperature resistance of the layer, or an organic binder, especially so as to make it simpler to produce the said layer, it being possible for crosslinking to take place simply, for example room-temperature crosslinking.

The binder has a different index from that of the particles and the difference between these two indices is preferably at least 0.1. The index of the particles is greater than 1.7 and that of the binder is preferably less than 1.6.

The binder is chosen from potassium silicates, sodium silicates, lithium silicates, aluminium phosphates, polymers of the polyvinyl alcohol type, thermosetting resins, acrylics, etc.

To promote the formation of aggregates of the desired size, at least one additive resulting in a random distribution of the particles within the binder may be added. The dispersion additive or dispersant is chosen from the following agents: an acid, a base or ionic polymers of low molecular mass, especially less than 50 000 g/mol.

It is also possible to add other agents and, for example, a wetting agent such as nonionic, anionic or cationic surfactants in order to provide a layer that is homogeneous on a large scale.

It is also possible to add rheology modifiers, such as cellulose ethers.

The layer thus defined may be deposited with a thickness of between 1 and 20 microns. The methods of depositing such a layer may be any of those known to those skilled in the art, such as deposition by screen printing, by paint coating, by dip coating, by spin coating, by flow coating, by spraying etc. However, it may be noted that the screen-printing deposition technique will be preferred when the substrate is intended to undergo heat treatments (toughening, for example), because of the regulatory provisions as regards safety.

When the desired thickness of the deposited layer is greater than 2 microns, a deposition process of the screen-printing type is used.

As a variant—a preferred embodiment—of a binder used in a screen-printing deposition process, a binder essentially consisting of a glass frit or melting agent is used. This glass frit or melting agent may, for example, be based on a mixture of zinc oxide, boron oxide, silica and sodium oxide.

This binder is applied in the present invention as binder for the scattering layer used in the backprojection and/or projection screen.

When the thickness of the layer is less than 4 microns, it is preferably deposited by flow coating or by spraying.

It is also possible to produce a layer whose thickness varies depending on the area of coverage on the surface; such an embodiment makes it possible to correct intrinsic inhomogeneities of a light source placed near the screen. For example, it is possible in this way to correct the intensity of light sources according to the viewer's viewing angle and thus to adjust the gain. The gain is defined in the following manner:

gain—luminance obtained with the screen viewed centrally/luminance obtained with a Lambertian screen with a gain of 1, viewed centrally.

Thus, the gain may also be defined in the following manner:

gain=central luminance×area of the screen/flux of the projector.

From these definitions, the projection screen is said to have a gain of 1 when it allows a 180° viewing angle (Lambertian screen).

In addition, if the screen allows the light rays to be reoriented in a more restricted viewing angle, thus increasing the luminance of the image within these angles, the screen will then have a gain of greater than 1.

According to another embodiment, selective deposition of the subsurface layer may be envisaged, and in this case it will be deposited only over part of the substrate, the remaining part being transparent.

According to the invention, the scattering layer is deposited on a first transparent substrate, which may or may not have a flat shape depending on the application.

The scattering layer producing a subsurface effect makes it possible to produce a screen whose resolution is at least $10^5$ dpi (dots per inch) or $10^6$ dpi.

To improve mechanical integrity of the first substrate coated with the scattering layer producing a subsurface effect, as described above, a lamination interlayer is joined to the first substrate on its opposed face (that face not covered with the scattering layer), it being possible for this interlayer to be made of PVB (polyvinyl butyral) or PU (polyurethane), for example, and in turn to be joined to a second, preferably tinted, substrate. As a non-limiting example, this may, for example, be a glass allowing the contrast to be improved, such as a grey glass with a TL of 40% or a grey "Parsol" glass with a light transmission of between 30% and 70%.

A third substrate is joined to this laminated element consisting of the first substrate, the lamination interlayer and the second substrate.

A sealing bead, made of plastic (for example PU or EPDM) is deposited by known means (for example extrusion) around the periphery of that face of the first substrate which includes its scattering layer. A third substrate is deposited on this sealing bead. This bead of material provides the assembly with mechanical integrity and maintains a cavity filled with a gaseous fluid (especially air) between the two substrates, thereby enhancing the scattering phenomena within the scattering functional layer.

According to one feature of the invention, the various (first, second, third) substrates used are either glass substrates or polymer (PMMA or polycarbonate) substrates.

Whatever the embodiment, the backprojection and/or projection screen according to the invention allows an image to be produced with a uniformity of at least 80% and preferably around 85%.

An image is said to be uniform when observation made by eye of this image on a screen having the dimensions of 600× 450 mm shows no variation in intensity of the image owing to the quality of the layer, for example. The eye starts to "see" intensity variations only when the intensity difference from one point on the screen to another is greater than 15%.

The display screen is suitable for viewing an image projected on both faces of the screen, with a viewing angle of less than or equal to 180° C.

In the present invention, the viewing angle is the angle for which the luminance is equal to one half of the luminance at the centre. In this case, the display is formed without any optical defect (blurring, distortion, edge effect, chromatic aberration, local luminance inhomegeneity) on either of the faces.

An alternative embodiment consists in incorporating, into the assembly at one of the faces of one of the first, second or third substrates, a coating having a functionality. This may be a coating with the function of blocking radiation of wavelengths in the infrared (for example using one or more silver layers surrounded by dielectric layers, or layers made of nitrides, such as TiN or ZrN, or layers made of metal oxides or steel or an Ni—Cr alloy), or having a low-emissivity function (for example a doped metal oxide such as $F:SnO_2$ or tin-doped indium oxide ITO or one or more silver layers), an antifogging function (by means of a hydrophilic layer), an antifouling function (photocatalytic coating, comprising $TiO_2$ at least partially crystallized in anatase form) or else an antireflection multilayer, for example of the $Si_3N_4/SiO_2/Si_3N_4/SiO_2$ type.

The envisaged applications of the invention are in particular the backprojection or projection systems used, for example, for displaying an image coming, for example, from video projectors, for the use of image walls in stadiums, for information display panels joined together as a wall or suspended, or for municipal or domestic use. Of course, the projection and/or backprojection screen may be used as a partition or a wall separating two enclosures.

For the purpose of the invention, the partition defines a wall between two different volumes, each being able to benefit from information broadcast on either side of the partition, such as a living room or sitting room or another room in a dwelling, or more generally a wall defining an internal volume from an external volume (one of the volumes possibly being the street), or in general a separating partition.

Likewise, for the purpose of the invention the projection and/or backprojection screen may constitute a panel for displaying information of an advertising nature, intended to broadcast a message in a sales area, the message being visible from all viewpoints.

The screen according to the invention described above offers many advantages:
  because the various constituent elements are made using an essentially mineral technology, the sensitivity of this screen to moisture and to UV radiation is very low; and
  the use of a scattering layer producing a subsurface effect, the viewing angle of which may be up to 180°, limits "hot spot" phenomena (By "hot spot" is meant that the viewer can perceive, along the projection axis and through the screen, the light source).

The invention claimed is:

1. A backprojection and/or projection screen, comprising: at least a first glass substrate having a scattering layer prepared by dispersing semitransparent mineral particles selected from the group consisting of silicon, aluminum, zirconium, titanium and cerium oxides, or a mixture of at least two of these oxides in a mineral binder, joined to a surface of the glass substrate which produces a subsurface effect, thereby forming a screen having front and rear faces, said scattering layer providing a viewing angle of less than or equal to 180° on both faces of said scattering layer.

2. The backprojection and/or projection screen according to claim 1, wherein the screen has a resolution ranging from $5 \times 10^3$ and $1 \times 10^5$ dpi.

3. The backprojection and/or projection screen according to claim 1, wherein the scattering layer is deposited on one of the faces of the first substrate and a lamination interlayer is deposited on the opposite face of the said first substrate, the said interlayer in turn being joined to a second substrate.

4. The backprojection and/or projection screen according to claim 3, wherein the second substrate is a tinted substrate.

5. The backprojection and/or projection screen according to claim 3, wherein the first glass substrate is prepared by dispersing semitransparent mineral particles having a refractive index greater than 1.7 in a mineral binder having a refractive index of less than 1.6 and is joined to a surface of the substrate.

6. The backprojection and/or projection screen according to claim 1, wherein the scattering layer is deposited on one of the faces of said first substrate, the said first substrate being in turn joined to a second substrate so as to form a double-glazing unit.

7. The backprojection and/or projection screen according to claim 1, wherein the first glass substrate and the scattering layer are joined to a third substrate, a peripheral bead separating that face of the first substrate which is coated with the said scattering layer from the third substrate.

8. The backprojection and/or projection screen according to claim 1, wherein the particles are mutually agglomerated in the light scattering layer.

9. The backprojection and/or projection screen according to claim 7, wherein the particle size ranges from 50 nm and 1 μm.

10. The backprojection and/or projection screen according to claim 7, wherein the binder essentially consists of a glass frit or melting agent.

11. The backprojection and/or projection screen according to claim 10, wherein the glass frit or melting agent is based on a mixture of zinc oxide, boron oxide, sodium oxide and silica.

12. The backprojection and/or projection screen according to claim 7, wherein the binder content of the light scattering layer ranges from 10 to 40% by volume.

13. The backprojection and/or projection screen according to claim 1, wherein the thickness of the scattering layer ranges from 0.5 and 5 μm.

14. The backprojection and/or projection screen according to claim 1, wherein in addition to said first glass substrate, second and third substrates are provided, at least one of which is a glass substrate.

15. The backprojection and/or projection screen according to claim 1, wherein in addition to said first glass substrate, second and third substrates are provided, at least one of which is a transparent substrate based on a polymer.

16. The backprojection and/or projection screen according to claim 1, wherein at least one of the first, second and third substrates possesses a coating having a function other than light scattering.

17. The backprojection and/or projection screen according to claim 16, wherein said coating has a low-emissivity function or an antistatic, antimisting, antifouling or antireflection function.

18. A method of viewing images, comprising:
dividing a viewing area into two different viewing zones by employing the backprojection and/or projection screen according to claim 1 as a separating partition that defines a wall between the two different zones, it being possible for each to benefit from information broadcast on either side of the partition.

19. A method for broadcasting information, comprising:
backprojecting and/or projecting broadcast information on either side of the separating partition that defines a wall between the two different viewing zones as claimed in claim 18.

20. A separating partition that defines a wall between two different viewing zones that comprises the backprojection and/or projection screen according to claim 1.

* * * * *